Aug. 11, 1964
C. S. STEPHENS
3,144,261
PLUMBING EQUIPMENT HAVING EYE-BOLT SECURING MEANS
Filed June 28, 1960
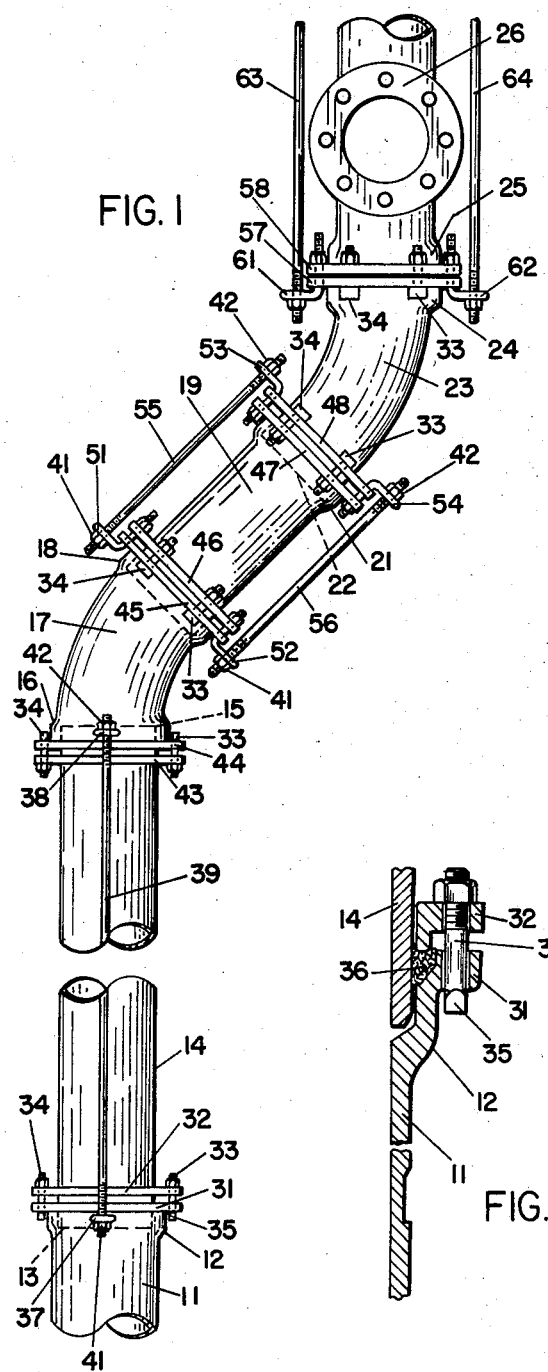
FIG. 1
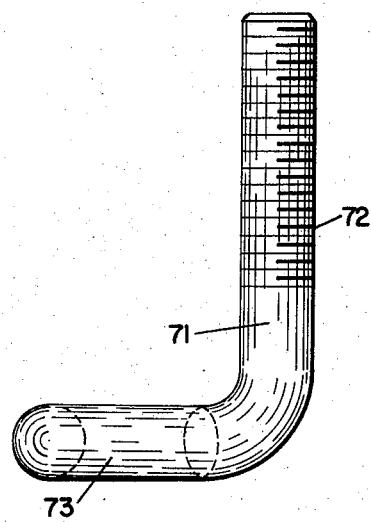
FIG. 3
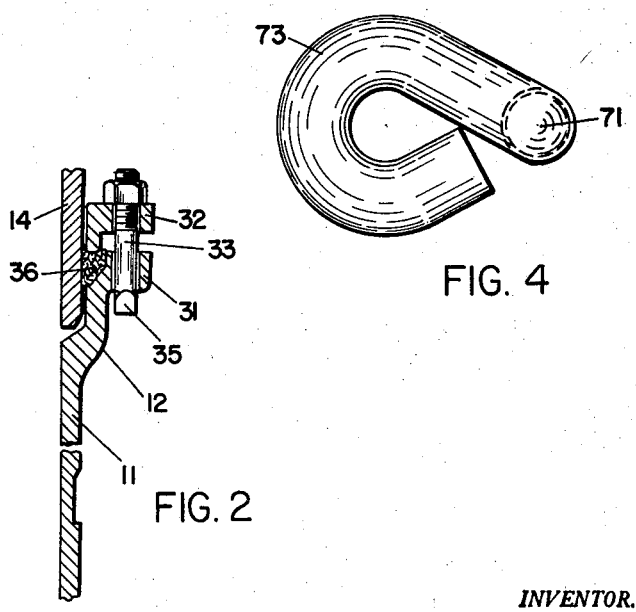
FIG. 2
FIG. 4
*INVENTOR.*
CHARLES S. STEPHENS
BY
*Jerome R. Cox*

United States Patent Office 3,144,261
Patented Aug. 11, 1964

3,144,261
PLUMBING EQUIPMENT HAVING EYE-BOLT
SECURING MEANS
Charles S. Stephens, Delaware, Ohio, assignor to Star
Industrial Supply Corporation, Columbus, Ohio, a corporation of Ohio
Filed June 28, 1960, Ser. No. 39,382
3 Claims. (Cl. 285—114)

The inventions disclosed in this application and claimed hereby relate to and are illustrated as applied to the art of securing sections of pipe, pipe fittings, valves etc. together to form leak-tight joints.

The art of securing together sections of pipe, pipe fittings, valves, etc. is highly developed. Heretofore it has been usual to join such elements together by means of flanges, nuts and bolts, rodding and bolts, offset lugs, etc.

My improvement comprises the use of a single element shown as an eye bolt as a substitute for a plurality of elements such as a bolt and an offset lug heretofore used to accomplish the same purposes.

One of the objects of my invention is the provision of new methods and apparatus for securing together sections of pipe, pipe fittings, valves, etc.

A further object of my invention is the provision of a new element comprising an eye-bolt of new shape and form for securing together such sections of pipe, pipe fittings, valves, etc.

Further objects and features of my invention should be apparent from a reading of the following description of several embodiments of my invention which are illustrated in the accompanying drawings and from a consideration of the following claims.

In the drawings:

FIGURE 1 is a fragmentary view in plan of several pipe elements joined together consisting of such elements as sections of pipe and associated fittings and rodding;

FIGURE 2 is a fragmentary view in section showing in more detail how the sections of pipe are secured to each other;

FIGURE 3 is a view in side elevation and on a greatly enlarged scale showing one of the eye bolts forming an embodiment of my invention; and FIGURE 4 is a view in top plan of the bolt shown in FIGURE 3.

Referring now especially to FIG. 1 for a more detailed description of the embodiments illustrated, it may be seen that I have shown therein a section of pipe 11 formed with a bell end 12 in which there is inserted and secured the spigot end 13 of another section of pipe 14. The opposite end of the pipe 14 has a spigot end 15 and is inserted in a bell end 16 of a 22½° bend fitting 17. The opposite end of the fitting 17 is also a bell end as indicated at 18. Into this bell end 18 is inserted a spigot end of a section of pipe 19. The opposite end of the pipe 19 is formed with a bell end 21 into which there is fitted a spigot end 22 of a 22½° bend fitting 23. The opposite end 24 of the fitting 23 is a bell end and is secured to a flanged or bell end 25 of a cross fitting 26.

The method of joining the section of pipe 11 to the section of pipe 14 is shown more clearly by comparing FIGURE 1 and FIGURE 2. As stated, the pipe 11 is formed with a bell end 12 which is provided with a flange 31, the flange being formed with a plurality of bolt or rod holes. Encircling the section 14 is a gland 32 in which there is formed a plurality of corresponding and aligned bolt or rod holes. Extending through some of the aligned holes are bolts such as 33 and 34 which are each formed with a T head such as the head 35. The bolts (e.g. 33 and 34) draw the flange 31 and the gland 32 closer to each other compressing the packing 36 in a lengthwise direction and expanding it in a transverse direction so as to seal securely the ends of the pipes 11 and 14 to each other. I also provide my special eye bolts such as the eye bolt 37 to aid in drawing the flange 31 toward the gland 32. In connection with the joint between pipe 14 and elbow 17, there are provided T bolts similar to T bolts 33 and 34 and a plurality of eye bolts such as my eye bolts 38. Extending through the eyes of the eye bolts 37 and 38 is a rod 39 which is threaded at the opposite ends and provided with nuts 41 and 42 which respectively draw the eye bolts 37 and 38 toward each other and thus aid in pressing the gland 32 toward the flange 31 and the corresponding gland 43 at the opposite end of pipe 14 toward the flange 44 formed on the adjacent end of elbow 17. I use a similar eye bolt and rodding on the opposite side of the pipe 14.

Bolts similar to bolts 33 and 34 secure flange 45 and gland 46 and press them toward each other, and similar bolts secure flange 47 and gland 48 and press them toward each other. I also use my eye bolts 51, 52, 53 and 54, in combination with rods and nuts 55 and 56, to aid drawing flanges 45 and 47 toward glands 46 and 48 respectively. Flange 57 formed on the end of elbow 23 is secured to flange 58 (which is formed on cross fitting 26) by similar T bolts and nuts and by my eye bolts 61 and 62. Eye bolts 61 and 62 combine with rodding 63 and 64 to secure the assembly consisting of the flange 57 and flange 58 to a similar assembly at the opposite end of the cross fitting 26.

Instead of the cross fitting 26, a valve or any other type of appropriate fitting may be substituted.

All of my eye bolts are similar. One of them, eye bolt 61, is shown on a larger scale and in greater detail in FIGS. 3 and 4. It may be seen that each comprises a threaded portion 71 having screw threads 72 and an eye portion 73 bent at right angles to the longitudinal axis of the threaded portion 71.

The assembly or operation of the embodiments of my invention is as follows:

Where a flanged or bell end of a pipe or fitting is to be joined to a spigot or unflanged end of an adjacent pipe or fitting, a gland such as 32 is slipped over said spigot end. Then a packing such as 36 is slipped over said spigot end. The bell end of the other element such as the bell end 12 with flange 31 is brought into contact with packing 36, and the assembly is tightened by means of T bolts such as 33 and 34 and by means of a plurality of my eye bolts such as 37, 38, 51, 52, 53, 54, 61 and 62. After the assemblies have been secured and tightened the various pipes and fittings are secured in place by rodding such as 39, 55, 56, 63 and 64.

The pipe 11, the pipe 14, the elbow 17 (or bend fitting), the pipe 19, the elbow or bend fitting 23, and the cross fitting 26 are all pipe elements each having either two bell ends, or one bell end and one spigot end, or two spigot ends. For the purpose of my invention which relates mainly to the eye-bolts such as the eye-bolts 37, 38, 51, 52, 53 and 54, 61 and 62, and the use thereof in joining pipe elements, these pipe elements are all substantial equivalents. In the use of my invention, which relates mainly to the use of the eye-bolts and which is a simplification of the usual methods of joining the portions of such pipe elements together, these pipe elements are equivalent. Therefore in the appended claims, lengths of pipe, elbows, cross fittings, T's, etc., are designated by the term "pipe element," which in the claims is to be understood as limited to pipe elements of the character described.

It is to be understood that the above described embodiments of my invention are for the purpose of illustration

I claim:

1. In combination, three lengths of pipe elements, consisting of two separated pipe elements, and a third intermediate pipe element interposed between said two separated pipe elements in which two of said three pipe elements each has a bell end formed integrally with a perforated flange, said flange having a plurality of holes extending therethrough and in which the other pipe element has at least one spigot end;

said three pipe elements having at least two bell ends and at least two spigot ends;

the joints between one of said pipe elements and a second said pipe element being a joint between a bell end and a spigot end and the joint between said second pipe element and the third pipe element being also a joint between a bell end and a spigot end, one of said spigot ends being inserted in the bell end of one of said pair of bell end pipe elements, and the other spigot end being inserted in the bell end of the other of said pair of bell end pipe elements;

a plurality of threaded rods extending along the length of said intermediate pipe element, provided for connecting said pair of separated flanged pipe elements together;

a plurality of eye-bolts for the flange of each of said flanged elements, each said eye-bolt having a threaded portion and an eye portion and each having the eye portion bent at right angles to the threaded portion, and the threaded portion of each eye-bolt extending through one of the holes of the associated flange and the eye portion of each having one end of one of said rods extending through it; and means comprising nuts secured onto said threaded rods for adjustably holding said eye-bolts from movement away from each other and thereby joining said flanges and said flanged pipe elements together.

2. In combination, three lengths of pipe elements, consisting of two separated pipe elements, each having a bell end with a perforated flange formed integrally therewith and having a plurality of holes extending therethrough, and a third intermediate pipe element interposed between said two bell end pipe elements and having a pair of spigot ends, one of said spigot ends being inserted in the bell end of one of said separated pair of bell end pipe elements, and the other spigot end being inserted in the bell end of the other of said pair of separated bell end pipe elements;

a plurality of threaded rods extending along the length of said intermediate pipe element, provided for connecting said pair of separated flanged pipe elements together;

a plurality of eye-bolts for the flange of each of said flanged elements, each said eye-bolt having a threaded portion and an eye portion and each having the eye portion bent at right angles to the threaded portion, and the threaded portion of each eye-bolt extending through one of the holes of the associated flange and the eye portion of each having one end of one of said rods extending through it; and means comprising nuts secured onto said threaded rods for adjustably holding said eye-bolts from movement away from each other and thereby joining said flanges and said flanged pipe elements together.

3. In combination three lengths of pipe elements consisting of a first pipe element having a bell end with a perforated flange formed integrally therewith, said flange having a plurality of holes extending therethrough;

a second pipe element separated from the first pipe element and having a spigot end; and a third or intermediate pipe element interposed between said first two mentioned separated pipe elements and having one spigot end and a bell end with a perforated flange formed integrally therewith, said flange having a plurality of holes extending therethrough;

the spigot end of said intermediate pipe element being inserted in the bell end of said first mentioned pipe element, and the bell end of said intermediate pipe element having the spigot end of the second mentioned pipe element inserted therein;

a metallic gland encircling the spigot end of the intermediate pipe element and positioned adjacent to the flange of the first mentioned pipe element and having a flange positioned adjacent to the flange of the bell end of the first mentioned pipe element, said flange having holes aligned with the holes in the flange of the bell end of the first mentioned pipe element;

a second metallic gland positioned encircling the spigot end of the second mentioned pipe element adjacent to the bell end of the intermediate pipe element and having a flange positioned adjacent to the flange of the bell end of said intermediate pipe element, said flange having holes aligned with the holes in said flange of the bell end of said intermediate pipe element;

packings compressed between said metallic glands and bell ends of the said pipe elements to which they are adjacent;

a plurality of T-bolts passing through some of the aligned holes of the flanges of the bell ends of said pipe elements and the flanges of the metallic glands associated therewith and securing said flanges together;

a plurality of threaded rods extending along the length of said intermediate pipe element provided for connecting the flange of said bell end of said first mentioned pipe element, and the flange of the gland associated with the spigot end of said second mentioned pipe element together;

a plurality of eye-bolts for the flanges of said bell ends of said pipe elements and for the flanges of the metallic glands, each of said eye-bolts having a threaded portion and an eye portion and each having the eye portion bent at right angles to the threaded portion, and the threaded portions of each extending through a pair of the aligned holes in the associated flanges of the bell end of one of said pipe elements and the gland encircling the spigot end of the cooperating pipe element and the eye portions of each having one end of one of said rods extending through them; and means comprising nuts secured onto said threaded rods for adjustably holding said eye-bolts from movement away from each other and thereby joining said flange of the flanged bell end of said first mentioned pipe element and the flange of the metallic glands associated with the spigot end of the second mentioned pipe element together.

References Cited in the file of this patent

UNITED STATES PATENTS

| | | |
|---|---|---|
| 765,484 | Hockstein | July 19, 1904 |
| 1,620,983 | Nichols | Mar. 15, 1927 |
| 1,652,418 | Sherrerd | Dec. 13, 1927 |
| 1,873,620 | Moore | Aug. 23, 1932 |
| 1,995,042 | Powers | Mar. 19, 1935 |
| 2,769,606 | Larson | Nov. 6, 1956 |
| 3,010,736 | Dilley | Nov. 28, 1961 |
| 3,010,740 | Dilley | Nov. 28, 1961 |